United States Patent
Do

(10) Patent No.: US 6,336,130 B1
(45) Date of Patent: Jan. 1, 2002

(54) ARRANGEMENT FOR IMPROVING AVAILABILITY OF SERVICES IN A COMMUNICATION SYSTEM

(75) Inventor: Thanh Van Do, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/413,215

(22) Filed: Oct. 5, 1999

Related U.S. Application Data

(63) Continuation of application No. PCT/NO98/00107, filed on Apr. 2, 1998.

(30) Foreign Application Priority Data

Apr. 8, 1997 (NO) ................................................ 971605

(51) Int. Cl.[7] ........................... G06F 15/16; G06F 13/00
(52) U.S. Cl. ...................................... 709/202; 709/201
(58) Field of Search ................................ 709/201, 202, 709/317

(56) References Cited

U.S. PATENT DOCUMENTS 5,825,759 A * 10/1998 Liu ............................. 370/331
5,974,441 A * 10/1999 Rogers et al. ............... 709/200
6,049,819 A * 4/2000 Buckle et al. ............... 709/202
6,076,099 A * 6/2000 Chen et al. .................. 709/202
6,085,086 A * 7/2000 La Porta et al. ............. 455/432

FOREIGN PATENT DOCUMENTS

WO 96/25012 A1 8/1996

OTHER PUBLICATIONS

S. Krause et al.; Mobile Service Agents Enabling 'Intelligence on Demand' in Telecommunications; Globecom '96 Communications: The Key to Global Prosperity; pp. 78–84, Nov. 1996.*

IEEE 46th Technology Conference, Apr. 28–May 1, 1996, Atlanta, Georgia, van Thanh et al., "Making Mobility Transparent to the Applications".

*Telektronikk,* vol. 90, No. 2, 1994, Norway, T. Handegård, "The TINA Consortium".

* cited by examiner

*Primary Examiner*—Kenneth R. Coulter
(74) *Attorney, Agent, or Firm*—Nixon & Vanderhye P.C.

(57) ABSTRACT

A communications systems, e.g., a telecommunications system, includes distributed hardware and software components which interact to provide services to one or more users. Mobile terminal communications with the distributed components are supported (1) by dividing a kernel transport network (kTN) into a fixed part and a mobile part, and (2) by using two agents. One terminal agent on the fixed part represents the mobile terminal, and another agent on each mobile terminal represents the fixed part of the kernel transport network.

22 Claims, 3 Drawing Sheets

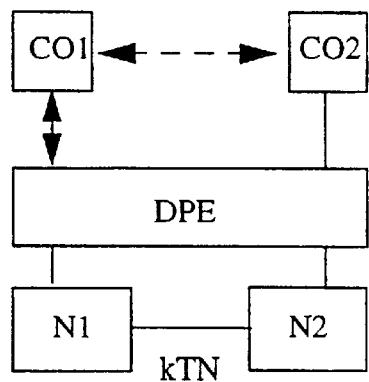
Figure 1    Object interactions in a Distributed Environment
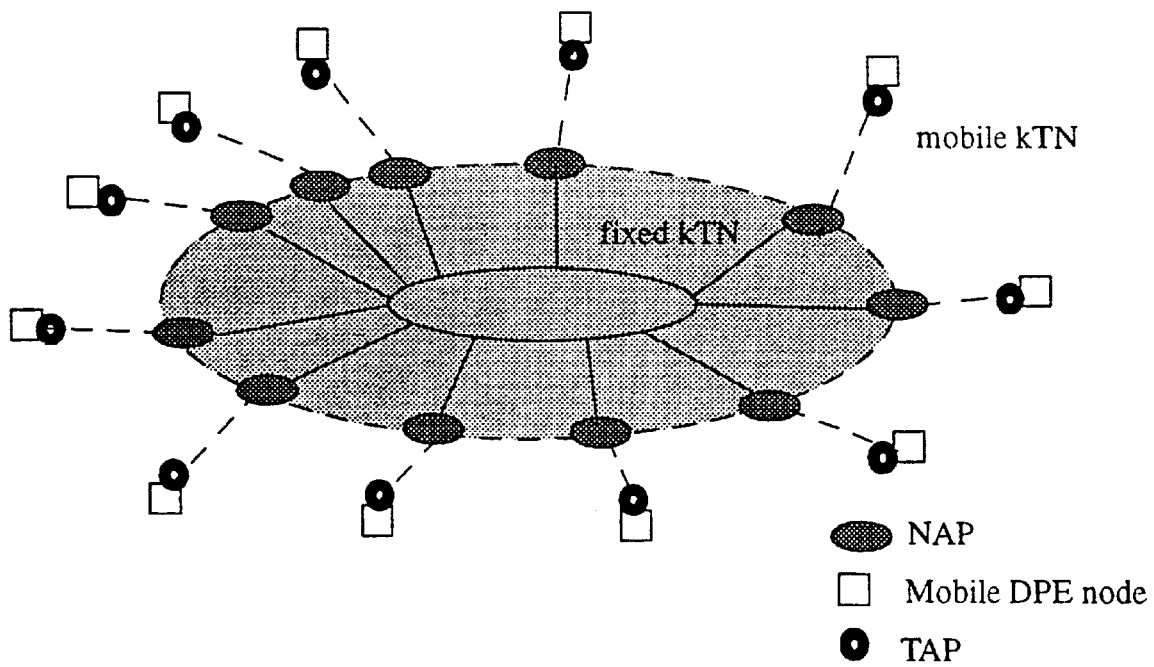
Figure 2    The kTN consisting of a fixed and a mobile part

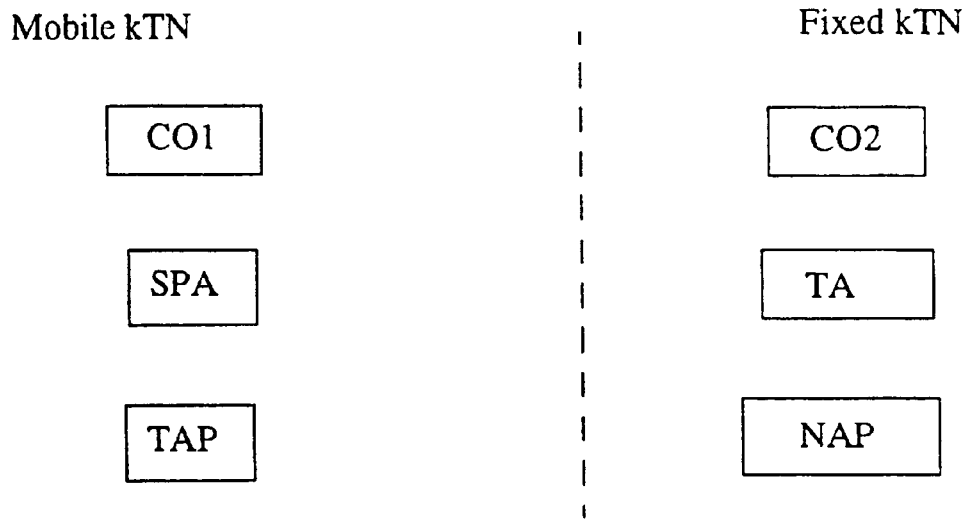
Figure 3    Objects involved in operational interactions
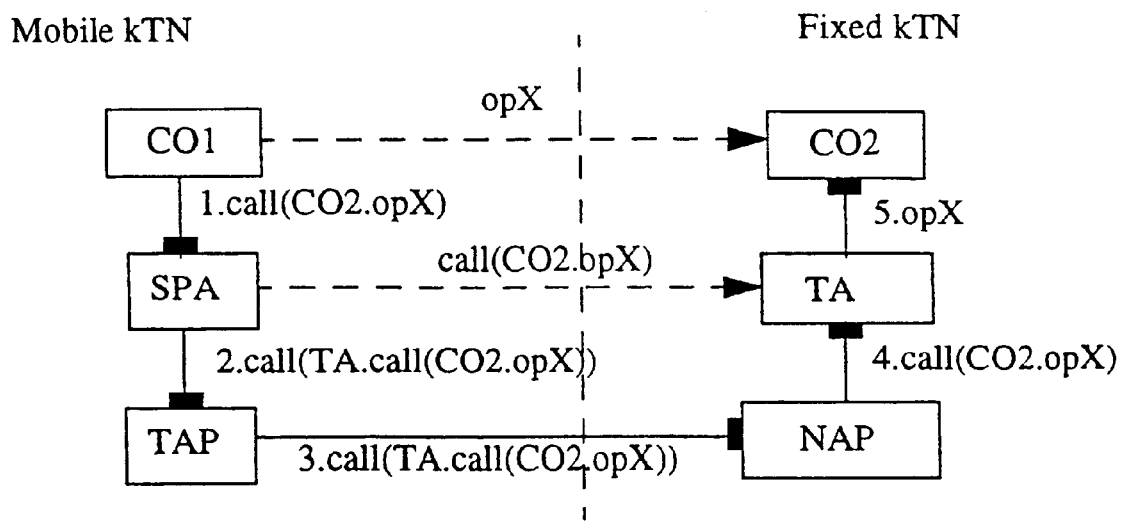
Figure 4    Interactions initiated by the mobile part

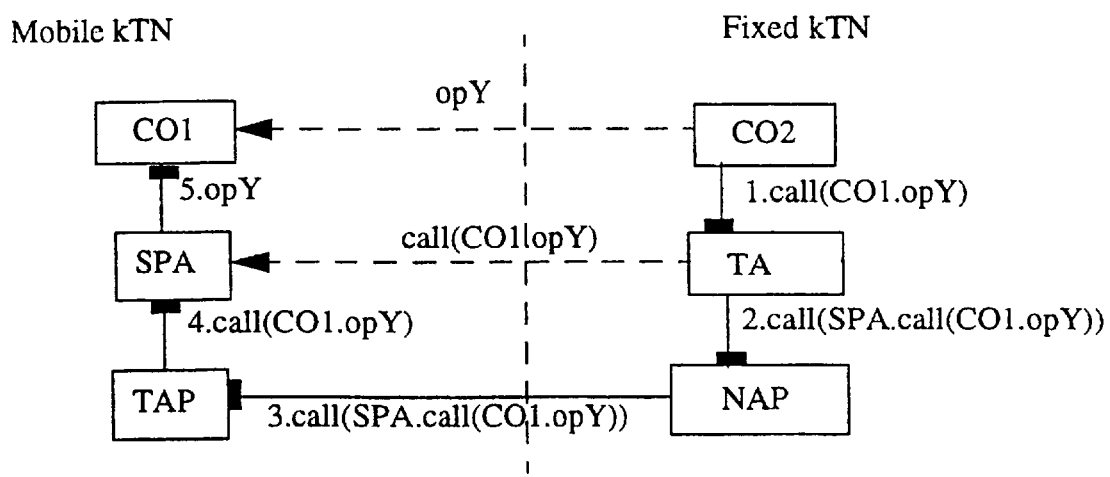
Figure 5   Interactions initiated by the fixed part

ARRANGEMENT FOR IMPROVING AVAILABILITY OF SERVICES IN A COMMUNICATION SYSTEM

This is a continuation of PCT application No. PCT/NO98/00107, filed Apr. 2, 1998, the entire content of which is hereby incorporated by reference in this application.

FIELD OF THE INVENTION

Generally, the present invention relates to an arrangement for improving availability of services in a communications system, especially a telecommunications system, said system comprising distributed hardware and software components which interact in order to provide services to one or more users.

More specifically the present invention relates to the improvement of such availability of services in all forms of terminal mobility.

Further, the present invention finds specific utilisation in connection with terminal mobility support in distributed systems, and even more specifically the mechanisms for such terminal mobility support in distributed systems.

BACKGROUND

An open distributed system is a category of distributed systems which are made up of components that may be obtained from a number of different sources, which together work as a single distributed system. The Open Distributed Processing (ODP) model provides an application interface to the distributed system. In distributed computing, this model is called the virtual main frame and is enabled by distributed object technology, the virtual main frame being created from "componentware".

The present invention will be described in the example, non-limiting context of the industry standard or open distributed processing, named Common Request Broker Architecture, CORBA, which in the present case will be used as a platform for test implementations.

In current distributed platforms, such as CORBA, (see Object Management Group, Inc. The Common Object Request Broker: Architecture and Specification, Revision 2.0, July 1995), terminal mobility is not addressed or supported, and hence, cannot be used in the design and implementation of mobile systems.

In current distributed environments, objects can interact with each other completely independent of where they are located, i.e., on the same machine or on different machines. In FIG. 1, the objects CO1 and CO2 are located on two different machines or nodes, N1 and N2, but can still interact as if they are located on the same machine. The DPE (Distributed Processing Environment) is responsible for marshalling the operation request into messages, locating the addressed object, sending the message to the destination node, unmarshalling the request, delivering the request to the addressed object, and returning the results to the requested object. The network used for the transportation and conveyance of an operation request is called kTN (kernel Transport Network) in TINA terminology, (see TINA-C, Engineering Modelling Concepts (DPE Kernel Specifications), November 1994).

The above applies for fixed systems, but not for mobile systems. In mobile systems, there are numerous nodes that are mobile. A mobile node may frequently change the node with which it has a direct link, and may disappear from a node and reappear later at any other node. The topology of a kernel Transport Network for systems containing mobile DPE nodes therefore changes and may also be undetermined in the sense that the connectivity of a mobile DPE node is not ensured unless additional functionality is inserted in the DPE. In such a mobile system, operational interactions are not guaranteed. Accordingly, there is a need for terminal mobility support functions in DPEs.

An object of the present invention is to provide terminal mobility support which solves the problems noted above.

Another object is to provide an arrangement where terminal mobility support is offered in a distributed environment.

Still another object of the present invention is to provide an arrangement enabling the use of a distributed environment in the design and implementation of mobile systems.

The above objects are achieved in an arrangement of the type as stated in the preamble, which according to the present invention is characterised by the features as stated in the present description and the appending patent claims described, illustrated, and claimed below.

BRIEF DESCRIPTION OF THE DRAWINGS

FIG. 1 is a block diagram illustrating how object interactions in a distributed environment can take place.

FIG. 2 illustrates schematically an embodiment of the present invention, illustrating how the kernel Transport Network kTN may consist of fixed and mobile parts.

FIG. 3 is a block diagram illustrating how objects can be involved in operational interactions.

FIG. 4 is a schematical diagram illustrating how interactions may be initiated by a mobile part.

FIG. 5 is a schematical diagram illustrating how interactions are initiated by a fixed part.

DETAILED DESCRIPTION

FIG. 1, as previously discussed, illustrates object interactions in a distributed environment. Operational interactions are not guaranteed if they occur in a mobile system. Terminal mobility support functions are introduced for distributed mobile systems. FIG. 2 and FIG. 3 illustrate an example embodiment of the present invention based on a division of the kTN and the use of agents.

Division of the kTN

The kTN network is divided into two parts:

a fixed part including all fixed DPE nodes.

a mobile part including all mobile DPE nodes.

At the boundary of the fixed part of the kTN, there are several Network Access Points (NAPs), i.e., points where a mobile DPE node, (i.e., a mobile terminal), can connect to the fixed kTN part.

An NAP object is introduced to represent a NAP on the kTN. An NAP object is an interceptor which stands at the boundary of the terminal domain and the telecom system domain and is responsible for checking, transforming and forwarding of interactions that cross the boundary. An NAP object has two communication interfaces, one with the mobile DPE and one with the fixed kTN. Several NAPs can be located at the same DPE node.

Each mobile DPE node may have one or several Terminal Access Points (TAP), i.e., the points where the mobile DPE node can exchange operations with other DPE nodes. A TAP will be represented by a TAP object in the terminal domain. Prior to any operational interaction, the mobile DPE, i.e., one of its TAPs, must be attached to a NAP. Operational interactions between a computational object residing on a mobile DPE and a computational object residing on a fixed DPE go through a TAP and a NAP.

Use of Agents

We introduced a Terminal_Agent Object (TA) to represent the mobile DPE node in the fixed part of the kTN. When the mobile DPE node is moving, the NAP to which the TAP is connected may change. The TA unburdens the requesting object on the fixed part, i.e, as shown in FIG. 3, and keeps track of the current NAP.

On the mobile DPE node, we introduce a SPA object (Service Provider Agent) to represent the fixed part of a kTN that the mobile node is communicating with. The SPA is thus entrusted with two responsibilities: supporting security functions and keeping location information. In this way, only one interceptor object is required in the terminal for managing both security and location updating. The introduction of the SPA is also convenient to keep the TAP hidden from the application objects. Instead of issuing an operation invocation to CO2, CO1 issues a request to the SPA. The reason is that a mobile DPE for example on a PABX may in fact have several TAPs which should be transparent to the application objects. The SPA will ensure this transparency.

Interactions Initiated By the Mobile Part

FIG. 4 shows an example of the request of an operation opX on CO2 by CO1. The request is packed inside an operation call (CO2.opX) on the SPA. The SPA on its turn invokes call (TA.call (CO2.opX) on the TAP. The TAP invokes call (TA.call (CO2.opX) on the NAP. The TAP invokes call (CO2.opX on the TA. Finally, the TA invokes opX on CO2. The operation results will be conveyed on the reciprocal way back to CO1.

Interactions Initiated by the Fixed Part

FIG. 5 shows an example of a request of an operation opY on CO1 initiated by CO2. The conveyance process is similar but reciprocal to the example above and we will not describe it again.

Location Registration and Deregistration

For interactions initiated by objects on the fixed side the success relies on two conditions. First, both the association between the TA and the NAP and the association between the NAP and TAP must be identified. If one or both of the two associations are undefined, the interaction will be unsuccessful. Second, the two associations must be consistent with each other. If the TAP is associated with an instance of a NAP, then the TA must be associated with the same instance of the NAP. An inconsistency will lead to failure.

When the mobile DPE is moving, the TAP-NAP association and the NAP-TA association must change correlatively and may sometimes be undefined. The operations necessary to determine these two associations and to supply this information to the TA are commonly referred to as location registration and location deregistration. Such a location registration and deregistration procedure must be implemented, but since there exists several known methods, we need not describe them here.

Merits of the Invention

This invention offers terminal mobility support in distributed environment.

Such a terminal mobility support is characterized by the division of the kernel Transport Network into a fixed and a mobile part. The mobile part includes the mobile terminals or mobile DPE nodes while the fixed part covers fixed machines or nodes. Terminal mobility support is implemented by the use of two agents: one agent residing on the fixed part and representing the mobile node and another agent residing on the mobile node and representing the fixed part.

The agent technology yields a high level of flexibility by allowing different ways of implementing the Terminal_Agent (TA) and the Service_Provider_Agent (SPA). The internal implementation of these agents can also be modified without affecting the rest of the system.

It enables the use of distributed environment in the design and implementation of mobile systems.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Although the present invention is described in relation to preferred example embodiments, it is to be understood that this disclosure is only illustrative and exemplary of the present invention. The scope of the invention is defined by the appended claims.

What is claimed is:

1. An arrangement in a network including a plurality of mobile terminals and a plurality of fixed terminals supporting distributed communication service operations between fixed and mobile terminals, the network comprising:
   a fixed network node including a mobile terminal agent that is configured to perform mobility management functions associated with the plurality of mobile terminals, and
   each of the mobile terminals including a fixed network node agent representing the fixed network node.

2. The arrangement in claim 1, wherein the fixed network node agent is configured to perform a security function.

3. The arrangement in claim 1, wherein the fixed network node agent is configured to perform a mobile location storage function.

4. The arrangement in claim 1, the network further comprising:
   plural network access points (NAPs) at a boundary between the mobile terminals and the fixed network node, each NAP corresponding to a point at which a mobile terminal can communicate with the fixed network node.

5. The arrangement in claim 4, wherein each NAP is configured to check, transform, and forward a communication crossing the boundary.

6. The arrangement in claim 4, wherein each NAP includes a mobile terminal interface and a fixed network node interface.

7. The arrangement in claim 4, wherein each mobile terminal includes one or more terminal access points (TAPs) such that for a communication between a mobile terminal and the fixed network node, a TAP in the mobile terminal is attached to one of the NAPs.

8. The arrangement in claim 7, wherein the fixed network node agent hides the TAP from application objects in the mobile terminal.

9. Arrangement for improving availability of a communication system, comprising distributed hardware and software components which interact via a network in order to provide services to one or more users, wherein terminal mobility is supported by dividing the network used for transportation and conveyance of an operation request into a fixed part and a mobile part, the mobile part including all mobile nodes and the fixed part including all the fixed nodes, and by introducing two agents, one agent residing in the fixed part and representing the mobile nodes and another agent residing in each mobile node and representing the fixed part.

10. Arrangement as claimed in claim 9, characterized in that at least one Network Access Point object, an NAP object, is introduced to represent a Network Access Point (NAP) on said kTN, said NAP object operating as an interceptor at the boundary of the terminal domain and the telecom system domain, and being responsible for checking, transforming and forwarding of interactions that cross the boundary.

11. Arrangement as claimed in claim 10, characterized in that any of said NAP objects may have two communication interfaces, one with the mobile DPE and one with the fixed kTN, and that several NAPs can be located at the same DPE node.

12. Arrangement as claimed in claim 9, characterized in that each mobile DPE node may have one or several Terminal Access Points, TAPs, and that a TAP may be represented by a TAP object in the terminal domain.

13. Arrangement as claimed in claim 10, characterized in that any operational interactions between a computational object residing on a mobile DPE and a computational object residing on a fixed DPE, is communicated through a TAP and an NAP.

14. Arrangement as claimed in claim 9, characterized in that a Terminal Agent object, TA object, is introduced to represent the mobile DPE node in the fixed part of the kTN, and that on the mobile DPE node there is introduced a service Provider Agent (SPA), to represent the fixed part of a kTN that the mobile node is communicating with.

15. Arrangement as claimed in claim 14, characterized in that said TA object adapted to unburden the requesting object on the fixed part (CO2), and is adapted also to keep track of which is the current NAP.

16. Arrangement as claimed in claim 15, characterized in that said SPA is adapted to be entrusted with two responsibilities, i.e., supporting security functions and keeping location information, for thereby reducing the terminal requirement for managing both security and location updating to only one interceptor.

17. Arrangement as claimed in claim 16, characterized in that said SPA is adapted to keep the TAP hidden from the application objects, for thereby ensuring transparency therebetween.

18. A method for use in a network having a fixed network part associated with a plurality of fixed nodes and a mobile network part associated with a plurality of mobile nodes, comprising:

a mobile node agent in the fixed part receiving from one of the fixed nodes a request for an operation by a mobile node;

the mobile node agent formulating an operating call to carry the request through the fixed network part; and receiving the carried request in a fixed node agent in the mobile node and forwarding the carried request to an application object in the mobile node.

19. The method in claim 18, wherein the mobile node includes one or more terminal access points (TAPs) and the fixed network part includes a plurality of network access points (NAPs) to provide mobile node access to the fixed network part, the method further comprising:

a mobile node attaching to a NAP through a TAP to permit an operational interaction between a computational object residing on the mobile node and a computational object residing on a fixed node.

20. The method according to claim 19, wherein in response to a request for an operation initiated by the mobile node, the method further comprising:

formulating the request as an operation call to the fixed node agent which then invokes the call on a TAP;

the TAP invoking the call on one of the NAPs;

the NAP invoking the call on the mobile node agent; and the mobile node agent invoking the requested operation on the computational object in the fixed network node.

21. The method in claim 19, wherein when the mobile node moves and changes a network access point (NAP), the mobile node agent keeps track of the NAP change.

22. The method in claim 19, wherein the fixed network node agent performs a security function and a mobile node location updating function for the fixed network.

* * * * *